(12) United States Patent
Baccouche et al.

(10) Patent No.: US 7,188,890 B1
(45) Date of Patent: Mar. 13, 2007

(54) ENERGY-ABSORBING DEVICE WITH A REDUCED INITIAL PEAK LOAD

(75) Inventors: Ridha Baccouche, Ann Arbor, MI (US); Bill Stanko, Canton, MI (US); Jamal Bakkar, Dearborn, MI (US); Hikmat Mahmood, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/162,349

(22) Filed: Sep. 7, 2005

(51) Int. Cl.
*B60K 7/00* (2006.01)

(52) U.S. Cl. .................. 296/187.03; 293/133
(58) Field of Classification Search ........... 296/187.03, 296/187.1, 187.11; 293/133, 155
See application file for complete search history.

(56) References Cited

U.S. PATENT DOCUMENTS

| | | | | |
|---|---|---|---|---|
| 3,511,345 A * | 5/1970 | Ando et al. ............ 293/133 |
| 3,552,525 A | 1/1971 | Schudel |
| 3,883,166 A | 5/1975 | Cadiou |
| 4,304,147 A * | 12/1981 | Linnemeier et al. ........ 74/492 |
| 5,403,049 A * | 4/1995 | Ebbinghaus .............. 293/133 |
| 5,492,207 A * | 2/1996 | Clausen ................. 188/377 |
| 5,597,055 A * | 1/1997 | Han et al. ............... 188/371 |
| 6,027,105 A * | 2/2000 | Dohrmann et al. ........ 293/133 |
| 6,106,039 A * | 8/2000 | Maki ..................... 293/133 |
| 6,135,251 A * | 10/2000 | Hartlieb et al. .......... 188/371 |
| 6,174,008 B1 | 1/2001 | Kramer et al. |
| 6,179,355 B1 * | 1/2001 | Chou et al. ............. 293/133 |
| 6,227,583 B1 * | 5/2001 | Eipper et al. ............ 293/133 |
| 6,231,095 B1 * | 5/2001 | Chou et al. ............. 293/133 |
| 6,601,886 B1 | 8/2003 | Thayer |
| 6,820,924 B2 * | 11/2004 | Caliskan et al. ........ 296/187.03 |
| 7,021,686 B2 * | 4/2006 | Glasgow et al. .......... 293/132 |
| 7,070,217 B2 * | 7/2006 | Longo .................... 293/133 |
| 2003/0178871 A1 | 9/2003 | Stoffels et al. |

* cited by examiner

*Primary Examiner*—Kiran B. Patel
(74) *Attorney, Agent, or Firm*—Gigette M. Bejin; Artz & Artz, P.C.

(57) ABSTRACT

An energy-absorbing device (34) with a reduced initial peak load (50) for enhancing the management of crash energy in an end structure (30') for a vehicle (30). The energy-absorbing device (34) has a deformable construction adapted for progressively folding along a longitudinal axis (60) under an oscillating crash load (34'). The oscillating crash load (34') is comprised of a mean load (48) and a peak load (50) that is in close proximity to the mean load (48).

15 Claims, 5 Drawing Sheets

ENERGY-ABSORBING DEVICE WITH A REDUCED INITIAL PEAK LOAD

TECHNICAL FIELD

The present invention relates generally to energy-absorbing devices, and more particularly to an energy-absorbing device having a reduced initial peak load for enhancing the management of crash energy in a vehicle.

BACKGROUND

Vehicles having crush zones with one or more energy-absorbing devices therein have significantly improved the safety of transportation.

With attention to FIGS. 1 through 3, there is shown one known energy-absorbing device comprised of a hollow metal tube 10 adapted for progressively folding in a collision. In particular, the tube 10 typically yields under an oscillating load with the formation of successive local buckles 12 along its longitudinal axis 14. This relationship is exemplified by the load-displacement curve 16 shown in FIG. 4.

The load-displacement curve 16 can be generally characterized by three stages, which include an initial response 18, a primary energy-absorption response 20, and a final response 22.

In the initial response 18, the tube 10 is elastically deformed until it receives a peak load 24. Typically, these tubes 10 deform under a sufficiently low peak load 24 for preventing injuries to the vehicle occupants while safely maximizing the crash load transferred to them and also maintaining the structural integrity of the vehicle frame upon which the tubes 10 are mounted.

Thereafter, during the primary energy-absorption response 20, the typical tube 10 is plastically deformed under an oscillating load 26. Each oscillation corresponds to the formation of one complete buckle 12 in the tube 10. The total displacement of the tube 10 and the mean value 28 of the oscillating load 26 typically comprise a substantial portion of the crash energy absorbed by the tube 10. Then, in the final response 22, the tube 10 typically is fully crushed with the load rapidly increasing therein.

As shown in FIG. 4, existing tubes 10 typically deform under a mean load 28 that is substantially lower than the peak load 24, e.g. less than half of the peak load 24. It is understood that a tube 10 crushed under a higher mean load can absorb more crash energy than a tube crushed under a lower mean load.

Furthermore, existing tubes 10 typically have a somewhat long construction with a relatively wide cross-section that is defined by a generally thick wall. In this way, the tubes 10 typically occupy a large space within an end structure of the vehicle.

It would therefore be desirable to provide an energy-absorbing device having an efficiently packaged construction for improving the management of crash energy.

SUMMARY OF THE INVENTION

An energy-absorbing device with a reduced initial peak load for enhancing the management of crash energy in vehicle is provided. The energy-absorbing device has a deformable construction adapted for progressively folding along a longitudinal axis under an oscillating crash load. The oscillating crash load is comprised of a mean load and a peak load that is in close proximity to the mean load.

One advantage of the invention is that an energy-absorbing device is provided that absorbs a substantial amount of crash energy in a vehicle and increases the safety of vehicle occupants.

Another advantage of the invention is that an energy-absorbing device is provided that minimizes a peak load transferred to a vehicle frame and remains securely mounted thereto during a collision.

Yet another advantage of the invention is that an energy-absorbing device is provided that has a substantially efficient construction for use in small packaging constraints, such as a front end portion of a compact vehicle.

Still another advantage of the invention is that an energy-absorbing device is provided that is sufficiently lightweight for enhancing the fuel economy of a vehicle having the energy-absorbing device therein.

Yet another advantage of the invention is that an energy-absorbing device is provided that deforms without conventional triggering mechanisms and thus decreases the manufacturing cycle time, as well as the costs associated therewith.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings, namely FIGS. 5 through 13, and described below by way of the examples of the invention.

FIG. 12 is a graph exemplifying a load-to-displacement relationship for the energy-absorbing device shown in FIGS. 9 through 11.

DETAILED DESCRIPTION OF THE INVENTION

Figure 13:
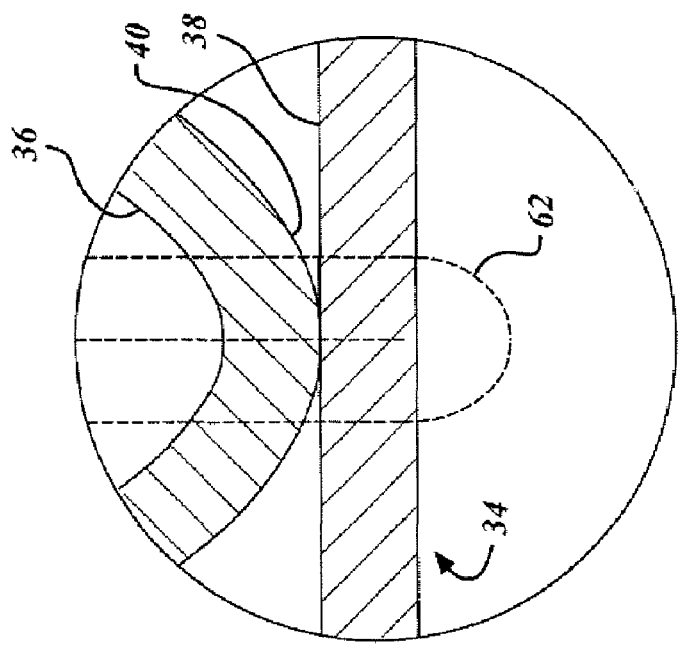
FIG. 13 is an enlarged view of the energy-absorbing device shown in FIG. 10, as taken from within circle 13, illustrating the inner tube reinforcing the outer tube.
Figure 1:
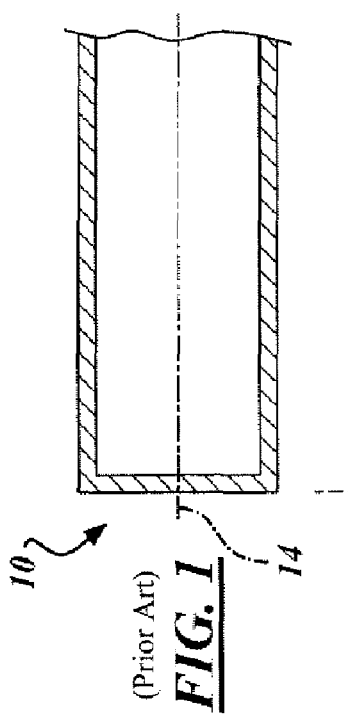
FIG. 1 is a cross-sectional view of a known metal tube for absorbing crash energy prior to contact with a vehicle or other barrier.
Figure 2:
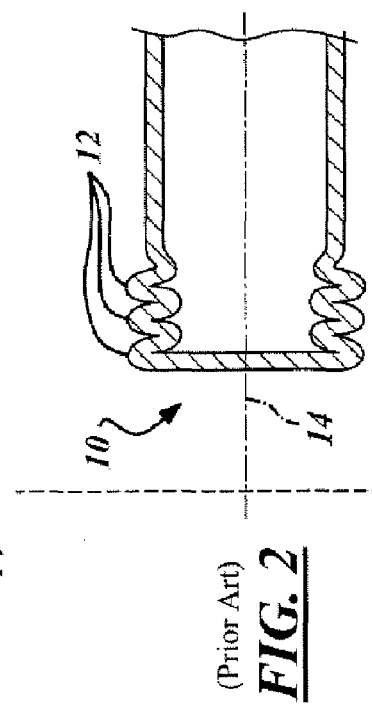
FIG. 2 is a cross-sectional view of the tube shown in FIG. 1, illustrating the tube progressively folding during a collision with a vehicle or other crash barrier.
Figure 3:
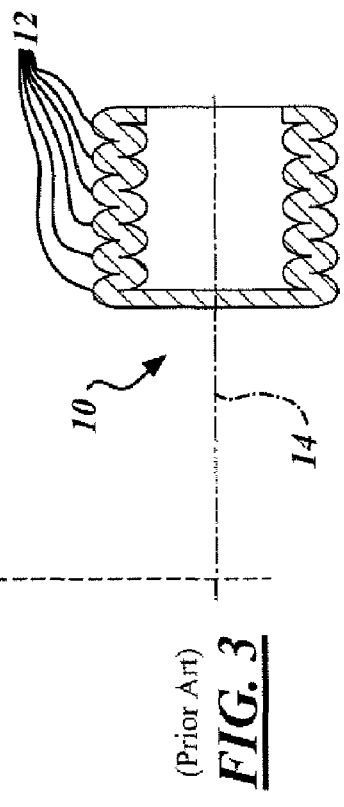
FIG. 3 is a cross-sectional view of the tube shown in FIG. 2, illustrating the tube fully crushed.
Figure 4:
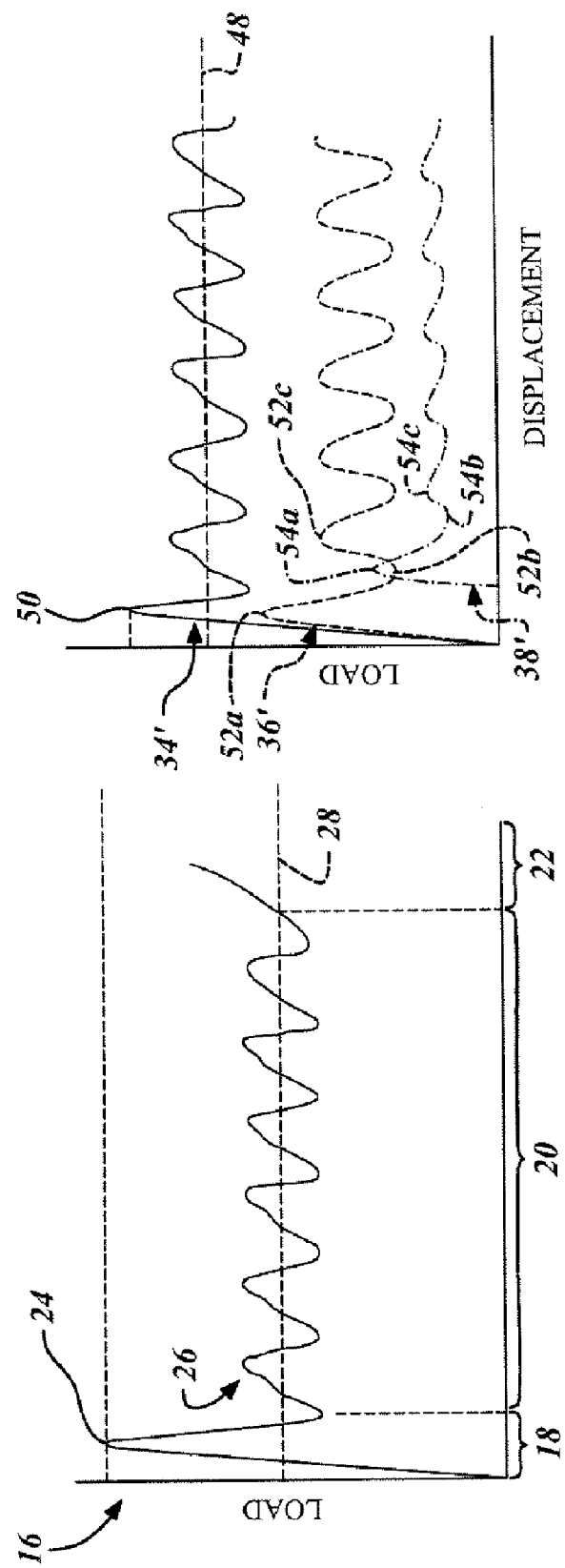
FIG. 4 is a graph exemplifying a load-to-displacement relationship for the conventional metal tube shown in FIGS. 1 through 3.

In the following figures, the same reference numerals are used to identify the same components in the various views.

The present invention is particularly suited for an energy-absorbing device for use within a front-end structure of a vehicle. To that end, the embodiments described herein employ features where the context permits. However, various other embodiments are contemplated having different combinations of the described features, having additional features other than those described herein, or even lacking one or more of those features. For instance, it is contemplated that the energy-absorbing device can be integrated in other portions of a vehicle, in a roadside barrier, or various other constructions as desired.

Figure 5:
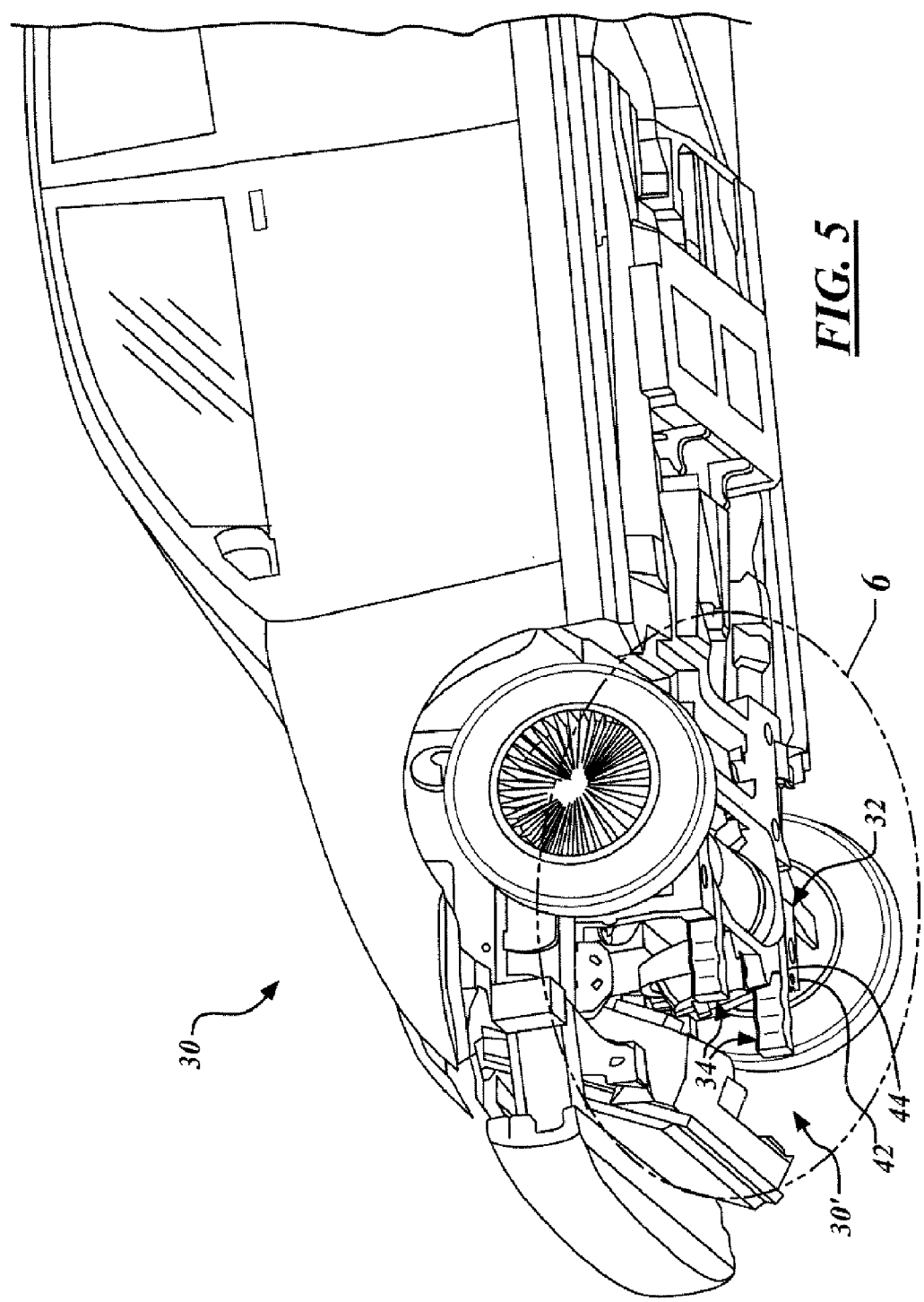
FIG. 5 is a perspective view of a vehicle having a front-end structure with an energy-absorbing device therein, according to one advantageous embodiment of the claimed invention.
Figure 6:
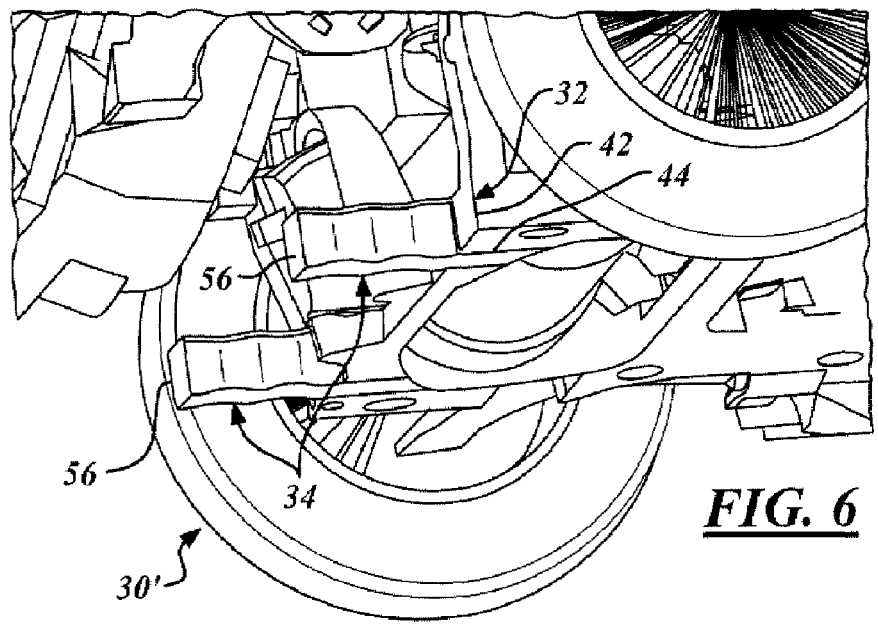
FIG. 6 is an enlarged perspective view of the energy-absorbing device shown in FIG. 5.

Referring to FIGS. 5 and 6, there is shown a vehicle 30 having a front-end portion 30' comprised of a vehicle frame 32 and an energy-absorbing device 34, according to one advantageous embodiment of the claimed invention. As best shown in FIG. 6, the energy-absorbing device 34 has a substantially compact construction mounted to the vehicle frame 32 within small packaging constraints. This feature is beneficial for increasing the available space for an engine compartment, passenger cabin, or a variety of systems integrated within the vehicle 30. Moreover, as detailed below, this construction is also advantageous for absorbing a substantial amount of crash energy.

Figure 7:
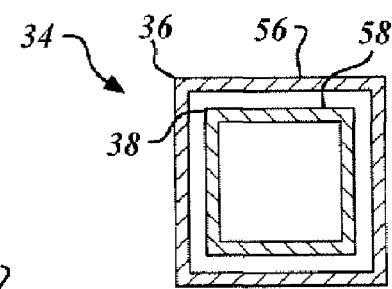
FIG. 7 is a lateral cross-sectional view of the energy-absorbing device shown in FIG. 6.
Figure 8A:
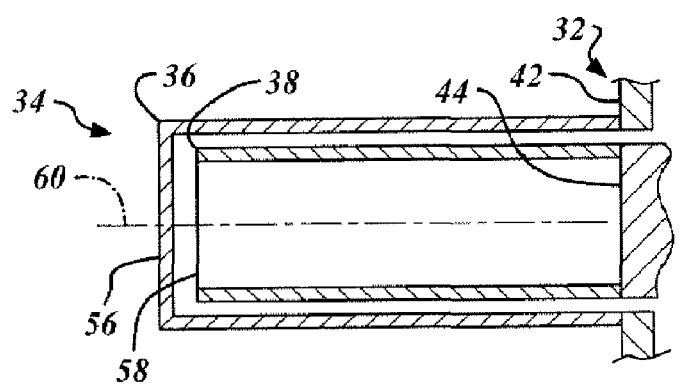
FIG. 8A is a longitudinal cross-sectional view of the energy-absorbing device shown in FIG. 6.

Referring now to FIGS. 7 and 8A, the energy-absorbing device 34 is comprised of an outer tube 36 and an inner tube 38. As detailed in the description for FIGS. 10 through 12, each tube 36, 38 has an axially-deformable construction adapted for forming successive local buckles 40 therein under an oscillating crash load.

In the embodiment shown in FIG. 8A, the outer tube 36 and the inner tube 38 provide two load paths. Specifically, the vehicle frame 32 has a first sub-frame 42 and a second sub-frame 44, which are independent load-bearing structures. The first sub-frame 42 has the outer tube 36 attached thereon, and the second sub-frame 44 has the inner tube 38 attached thereon. Accordingly, the front-end portion 30' of the vehicle 30 provides two load paths for enhancing the management of crash energy.

Figure 8B:
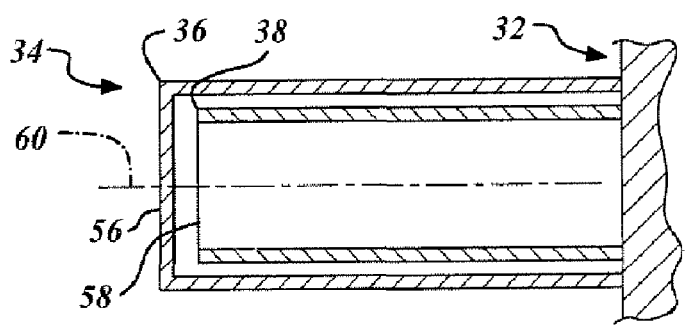
FIG. 8B is a longitudinal cross-sectional view of the energy-absorbing device shown in FIG. 6, according to another advantageous embodiment of the claimed invention.

However, as exemplified in the embodiment shown in FIG. 8B, it is contemplated that the outer tube 36 and the inner tube 38 can instead be mounted to the same integral portion of the vehicle frame 32 as desired.

Figure 9:
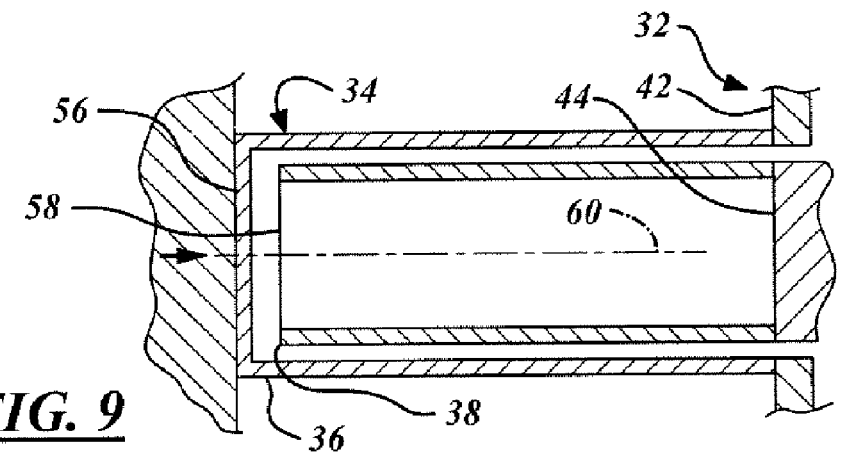
FIG. 9 is a cross-sectional view of the energy-absorbing device shown in FIG. 8A, illustrating the initial impact of a vehicle or other crash barrier on an outer tube of the energy-absorbing device.
Figure 10:
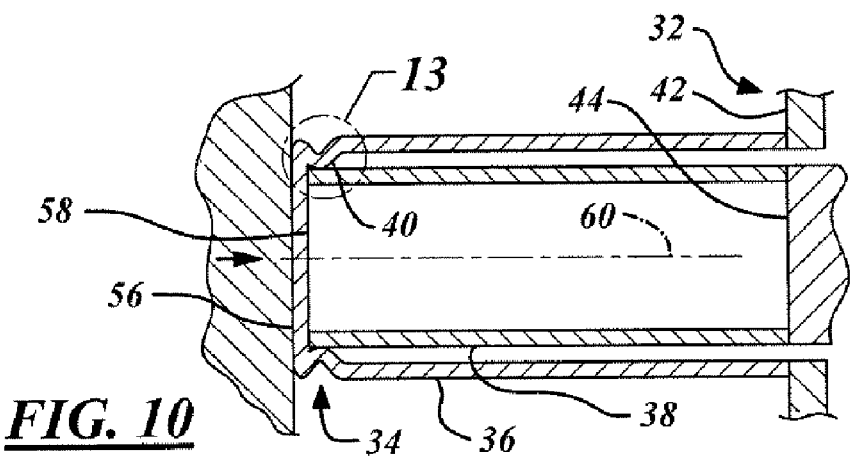
FIG. 10 is a cross-sectional view of the energy-absorbing device shown in FIG. 9, illustrating the outer tube plastically deforming and being reinforced by an inner tube of the energy-absorbing device.
Figure 11:
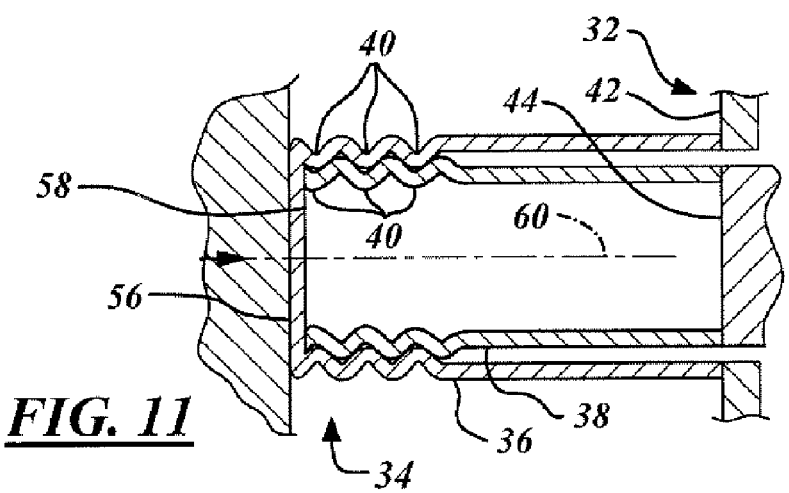
FIG. 11 is a cross-sectional view of the energy-absorbing device shown in FIG. 10, illustrating further deformation of the outer tube and the inner tube.

Referring now to FIGS. 9 through 11, there is sequentially illustrated the axial deformation of the energy-absorbing device 34, according to one advantageous embodiment of the claimed invention. This axial deformation is represented by the load-displacement graph schematically shown in FIG. 12.

As shown in FIG. 12, the outer tube 36 and the inner tube 38 deform under respective oscillating sub-loads 36', 38', which together comprise the total oscillating crash load 34' that axially collapses the energy-absorbing device 34. In addition, as explained in the description for FIG. 11, the total oscillating load is further comprised of a reinforcement load (not shown) that is provided by the inner tube 38 reinforcing the outer tube 36.

The oscillating sub-loads 36', 38' in the tubes 36, 38 are sufficiently out-of-phase for producing the total oscillating crash load 34' with a substantially high overall mean load 48, e.g. about 15,000 lbf, and an overall peak load 50 in close proximity to the mean load 48. The high mean load 48 is beneficial for absorbing a substantial amount of the crash energy. In addition, the overall peak load 50 is sufficiently low, e.g. only about 25% larger than the overall mean load 48, for preventing injuries to the vehicle occupants and maintaining the structural integrity of the vehicle frame 32.

However, it is contemplated that the overall peak load 50 can be more or less than twenty-five percent (25%) larger than the overall mean load 48. Additionally, the overall mean load 48 can be higher or lower than 15,000 lbf as desired.

Each oscillating sub-load 36', 38' in the respective tubes 36, 38 has an overall peak sub-load 52a, 54a followed by a cyclic minimum sub-load 52b, 54b and a cyclic maximum sub-load 52c, 54c. In this embodiment, the oscillating sub-load 36' in the outer tube 36 is one-quarter of a wavelength out of phase with the oscillating sub-load 38' of the inner tube 38. In this way, the outer tube 36 deforms under the cyclic minimum sub-load 52b concurrently as the inner tube 38 deforms under its peak sub-load 54a. It will be appreciated that this feature is beneficial for providing the higher overall mean load 48 and minimizing the overall peak load 50.

As best shown in FIG. 8A, this out-of-phase relationship is accomplished by offsetting respective end portions 56, 58 of the outer tube 36 and the inner tube 38 along a longitudinal axis 60 of the device 34. In particular, the end portion 56 of the outer tube 36 is positioned for receiving the initial crash load before the end portion 58 of the inner tube 38. Referring back to FIG. 12, the inner tube 38 is offset a sufficient distance for synchronizing the peak sub-load 54a of the inner tube 38 with the first cyclic minimum sub-load 52b of the outer tube 36. Accordingly, the energy-absorbing device 34 deforms under a reduced overall peak load 50 and absorbs a substantial amount of the crash energy.

Also, this offset construction is further beneficial for deforming without conventional triggering mechanisms therein. Examples of the conventional triggering mechanisms include indentations, deep wrinkles, and other known stress risers formed in the tube's perimeter. For this reason, the device 34 eliminates the need for the manufacturing processes, which would otherwise be required for forming the triggering mechanisms in the tubes 36, 38. Accordingly, the offset construction of the device 34 decreases the manufacturing cycle time and the costs associated therewith. However, it is understood that the tubes 36, 38 can instead have stress risers as desired.

It is contemplated that the outer tube 36 can instead be offset from the inner tube 38 in a variety of other suitable ways for reducing the overall peak load 50 and/or triggering deformation therein. Also, it is understood that the outer tube 36 and/or the inner tube 38 can have various other suitable constructions that deform under a peak load 50 in close proximity to the mean load 48. Moreover, it will be appreciated that more than two tubes 36, 38 or equivalents thereof can be utilized as desired and otherwise positioned as desired.

Furthermore, with attention to the embodiment shown in FIGS. 10 and 13, the inner tube 38 is sufficiently offset inwardly from the outer tube 36 for contacting and strengthening the outer tube 36 as the outer tube 36 progressively folds. Namely, as best shown in FIG. 13, the inner tube 38 can sufficiently support the outer tube 36 and minimize deep-stage collapse 62 in each successive buckle 40 or fold. In this regard, the inner tube 38 minimizes the valley amplitude of the overall crash load 34' and strengthens the overall energy-absorbing device 34.

With attention to FIG. 8A, each tube 36, 38 has a substantially thin-wall box construction for progressively folding along the longitudinal axis 60. For example, the wall of each tube 36, 38 is one (1) to three (3) millimeters thick. However, the wall of each tube 36, 38 can be higher or lower than this range so long as the purposes of the claimed invention are accomplished.

It will be appreciated that an otherwise sufficiently thicker wall may not progressively fold and therefore may absorb less crash energy. For instance, a sufficiently thicker wall may peel outwardly instead of folding with successive bellows similar to an accordion. However, it is contemplated that the energy-absorbing device 34 can have various other suitable constructions for deforming in a variety of ways.

Also, in this embodiment, the outer tube 36 and the inner tube 38 are comprised of aluminum. In this respect, the energy-absorbing device 34 is sufficiently strong for absorbing a high amount of crash energy and also significantly lightweight for enhancing the fuel economy of the vehicle 30. It is understood that the outer tube 36 and the inner tube 38 can be comprised of a variety of other suitable materials.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims

What is claimed is:

1. An energy-absorbing device for an end structure of a vehicle, comprising:
   an outer tube attached to a vehicle frame; and
   an inner tube within said outer tube and attached to said vehicle frame;
   said outer tube and said inner tube having a deformable construction;
   said outer tube adapted for progressively folding along a longitudinal axis under a first oscillating sub-load;
   said inner tube adapted for progressively folding along said longitudinal axis under a second oscillating sub-load;
   each of said first oscillating sub-load and said second oscillating sub-load having a peak sub-load and a cyclic minimum sub-load with said outer tube receiving said cyclic minimum sub-load when said inner tube receives said peak sub-load;
   said first oscillating sub-load and said second oscillating sub-load comprising a total oscillating load absorbing crash energy.

2. The energy-absorbing device recited in claim 1 wherein at least one of said outer tube and said inner tube is defined by a substantially thin wall.

3. The energy-absorbing device recited in claim 1 wherein said inner tube has a first end portion and said outer tube has a second end portion offset from said first end portion of said inner tube along said longitudinal axis.

4. The energy-absorbing device recited in claim 1 wherein said first oscillating sub-load is offset from said second oscillating sub-load by one-quarter of a wavelength.

5. The energy-absorbing device recited in claim 1 wherein at least one of said outer tube and said inner tube is comprised of a substantially lightweight metal.

6. The energy-absorbing device recited in claim 5 wherein said substantially lightweight material is comprised of aluminum.

7. An end structure for a vehicle, comprising:
   a vehicle frame;
   said energy-absorbing device recited in claim 1 and attached to said vehicle frame.

8. The end structure recited in claim 7 wherein said vehicle frame includes at least two sub-frames with said at least two deformable members respectfully mounted thereon for providing at least two load paths.

9. An energy-absorbing device for an end structure of a vehicle, comprising:
   an outer tube attached to a vehicle frame; and
   an inner tube within said outer tube and attached to said vehicle frame;
   said outer tube and said inner tube having a deformable construction;
   said outer tube adapted for progressively folding along a longitudinal axis under a first oscillating sub-load;
   said inner tube adapted for progressively folding along said longitudinal axis under a second oscillating sub-load;
   each of said first oscillating sub-load and said second oscillating sub-load having a peak sub-load and a cyclic minimum sub-load with said outer tube receiving said cyclic minimum sub-load when said inner tube receives said peak sub-load;
   said first oscillating sub-load and said second oscillating sub-load comprising a total oscillating crash load for absorbing crash energy;
   said inner tube adjacent to said outer tube and reinforcing said outer tube when said outer tube progressively folds.

10. The energy-absorbing device recited in claim 9 wherein each of said first oscillating sub-load and said second oscillating sub-load has a cyclic maximum sub-load with said outer tube receiving said cyclic maximum sub-load when said inner tube receives said cyclic minimum sub-load.

11. The energy-absorbing device recited in claim 9 wherein said inner tube has a first end portion and said outer tube has a second end portion offset from said first end portion of said inner tube along said longitudinal axis.

12. The energy-absorbing device recited in claim 9 wherein said first oscillating sub-load is offset from said second oscillating sub-load by one-quarter of a wavelength.

13. The energy-absorbing device recited in claim 9 wherein at least one of said outer tube and said inner tube is defined by a substantially thin wall.

14. The energy-absorbing device recited in claim 9 wherein at least one of said outer tube and said inner tube is comprised of a substantially lightweight metal.

15. The energy-absorbing device recited in claim 14 wherein said substantially lightweight material is comprised of aluminum.

\* \* \* \* \*